(12) United States Patent
Tamura et al.

(10) Patent No.: US 8,303,674 B2
(45) Date of Patent: Nov. 6, 2012

(54) HYDROGEN GENERATOR AND FUEL CELL SYSTEM

(75) Inventors: Yoshio Tamura, Hyogo (JP); Kiyoshi Taguchi, Osaka (JP); Masataka Ozeki, Osaka (JP); Hideo Ohara, Osaka (JP)

(73) Assignee: Panasonic Corporation, Osaka (JP)

( * ) Notice: Subject to any disclaimer, the term of this patent is extended or adjusted under 35 U.S.C. 154(b) by 587 days.

(21) Appl. No.: 12/528,921

(22) PCT Filed: Jan. 9, 2009

(86) PCT No.: PCT/JP2009/000066
§ 371 (c)(1),
(2), (4) Date: Aug. 27, 2009

(87) PCT Pub. No.: WO2009/087973
PCT Pub. Date: Jul. 16, 2009

(65) Prior Publication Data
US 2010/0068573 A1    Mar. 18, 2010

(30) Foreign Application Priority Data
Jan. 9, 2008  (JP) ................. 2008-002311

(51) Int. Cl.
*B01J 7/00*  (2006.01)

(52) U.S. Cl. ......... 48/61; 48/127.9; 422/112; 422/198; 429/423; 429/427; 429/443; 429/444

(58) Field of Classification Search .......... 429/408, 429/410, 414, 423–425, 427–429, 443–447, 429/90; 422/112–115, 198, 200; 48/61, 48/127.9
See application file for complete search history.

(56) References Cited

U.S. PATENT DOCUMENTS

| | | | | |
|---|---|---|---|---|
| 3,368,923 A | * | 2/1968 | Smith | 429/444 |
| 3,976,506 A | * | 8/1976 | Landau | 429/414 |
| 5,340,663 A | * | 8/1994 | Buswell et al. | 429/423 |
| 5,401,589 A | * | 3/1995 | Palmer et al. | 429/408 |
| 6,838,063 B2 | * | 1/2005 | Kondo et al. | 422/209 |
| 7,153,599 B2 | * | 12/2006 | Bunker et al. | 429/415 |
| 7,264,897 B2 | * | 9/2007 | Sato et al. | 429/412 |
| 7,410,515 B2 | * | 8/2008 | Takeyama et al. | 48/127.9 |
| 7,666,236 B2 | * | 2/2010 | Tamura et al. | 48/197 R |
| 7,811,712 B2 | * | 10/2010 | Ueda et al. | 429/429 |
| 2003/0138688 A1 | * | 7/2003 | Hattori et al. | 429/34 |
| 2004/0043263 A1 | * | 3/2004 | Takeyama et al. | 429/19 |
| 2006/0019134 A1 | * | 1/2006 | Yagi et al. | 429/17 |

FOREIGN PATENT DOCUMENTS

| | | |
|---|---|---|
| JP | 60-210501 | 10/1985 |
| JP | 2002-154807 | 5/2002 |
| JP | 2003-203664 | 7/2003 |

(Continued)

*Primary Examiner* — Joseph Drodge
(74) *Attorney, Agent, or Firm* — McDermott Will & Emery LLP

(57) ABSTRACT

A hydrogen generator (100) includes: a reformer (1) configured to generate a hydrogen-containing gas using a raw material and steam; a water evaporator (4) configured to supply the steam to the reformer (1); a sealing device (10) provided on a passage located downstream of the reformer (1) and configured to block a gas in the passage from flowing to the atmosphere; and a depressurizer (3) provided on a passage located upstream of the reformer (1) and configured to release to the atmosphere, pressure in the hydrogen generator (100) which pressure is increased by water evaporation in the water evaporator (4) after the sealing device (10) is closed.

20 Claims, 5 Drawing Sheets

FOREIGN PATENT DOCUMENTS

| | | |
|---|---|---|
| JP | 2003-282114 | 10/2003 |
| JP | 2003-306309 | 10/2003 |
| JP | 2004-178842 | 6/2004 |
| JP | 2005-243330 | 9/2005 |
| JP | 2007-254251 | 10/2007 |
| WO | WO 2006/013917 A1 | 2/2006 |

* cited by examiner

HYDROGEN GENERATOR AND FUEL CELL SYSTEM

RELATED APPLICATIONS

This application is the U.S. National Phase under 35 U.S.C. §371 of International Application No. PCT/JP2009/000066, filed on Jan. 9, 2009, which in turn claims the benefit of Japanese Application No. 2008-002311, filed on Jan. 9, 2008, the disclosures of which Applications are incorporated by reference herein.

TECHNICAL FIELD

The present invention relates to a hydrogen generator configured to generate a hydrogen-containing gas from a hydrocarbon-based raw material and water by a steam-reforming reaction. In addition, the present invention also relates to a fuel cell system configured to generate electric power using hydrogen generated by the hydrogen generator and oxygen.

BACKGROUND ART

A fuel cell system capable of carrying out highly-efficient, small-scale electric power generation has been expected as a distributed power generating system capable of realizing high energy use efficiency, since it is easy to configure a system for utilizing heat energy generated when a fuel cell generates electric power.

In the electric power generating operation of the fuel cell system, a hydrogen-containing gas and air (oxidizing gas) are supplied to a fuel cell stack (hereinafter simply referred to as "fuel cell") provided as a main body of an electric power generating portion of the fuel cell system. Then, an electrochemical reaction using hydrogen contained in the hydrogen-containing gas supplied to the fuel cell and oxygen contained in the air supplied to the fuel cell proceeds in the fuel cell. By the progress of the electrochemical reaction, chemical energies of the hydrogen and the oxygen are directly converted into an electric energy in the fuel cell. Thus, the fuel cell system can output electric power to a load.

Here, a system for supplying the hydrogen-containing gas necessary during the electric power generating operation of the fuel cell system is not developed as an infrastructure. Therefore, a conventional fuel cell system is provided with a hydrogen generator configured to generate the hydrogen-containing gas necessary during the electric power generating operation. The hydrogen generator includes at least a reformer. By the progress of a steam-reforming reaction in a reforming catalyst body provided in the reformer, the hydrogen-containing gas is generated from the raw material, such as a city gas containing an organic compound, and water. In this case, the reforming catalyst body of the reformer is heated by a suitable heating device to a temperature suitable for the progress of the steam-reforming reaction. For example, since the heating device (burner, or the like) can combusts a mixture gas of the city gas and the air, the reforming catalyst body of the reformer can be heated by a high-temperature flue gas. In addition, in the electric power generating operation of the fuel cell, an anode off gas unconsumed in the fuel cell can be combusted in the above-described burner. Thus, the reformer having been heated to have a suitable temperature can efficiently generate the hydrogen-containing gas by the reforming reaction between the raw material, such as the city gas, and the steam.

The steam is generated by using a water evaporator provided in the hydrogen generator and is used in the reforming reaction of the reformer.

Moreover, while the fuel cell stops operating, input portions and output portions of gases (the raw material, the hydrogen-containing gas, and the oxidizing gas) and reforming water are sealed to prevent gas passages of the hydrogen generator and reactant gas passages of the fuel cell from being communicated with the atmosphere. By sealing these portions, it is possible to prevent outside air from getting into the fuel cell and the hydrogen generator.

Meanwhile, with the input portions and the output portions completely sealed, an internal state of the fuel cell system may become an excessive positive pressure state or an excessive negative pressure state with respect to the atmospheric pressure.

Especially, in a case where the communication between an internal space of the hydrogen generator and the outside air is blocked while the hydrogen generator stops operating, i.e., in a case where a sealed state of the hydrogen generator is realized while the hydrogen generator stops operating, an excessive pressure applied state of the hydrogen generator may occur by a volume expansion caused due to water evaporation in the water evaporator. Here, by open-close control of, for example, a solenoid valve for sealing, the inside of the hydrogen generator is temporarily open to the atmosphere to depressurize the inside of the hydrogen generator (see Patent Document 2 for example).

Specifically, Patent Document 2 (for example, paragraph 0039) describes a method in which: a controller of the hydrogen generator detects the increase in the internal pressure of the hydrogen generator; and if the internal pressure abnormally increases, an on-off valve provided downstream of the reformer is temporarily open to discharge an internal gas of the hydrogen generator to an outside of the hydrogen generator.

Moreover, in a case where the temperature of the hydrogen generator is decreased after the sealed state is realized, and this causes the negative pressure state, a predetermined amount of the raw material is forcibly supplied to the inside of the fuel cell system to pressurize the inside of the fuel cell system.

These depressurizing and pressurizing operations are hereinafter referred to as a pressure keeping operation of hydrogen generator. By the pressure keeping operation, the operation of the hydrogen generator can be appropriately stopped while preventing the internal pressure of the hydrogen generator from being applied to devices, i.e., maintaining the internal pressure of the hydrogen generator at an appropriate level.

In a case where power supply to the hydrogen generator is cut by power outage or the like during the operation of the hydrogen generator, and this stops the operation of the hydrogen generator, the increased internal pressure of the hydrogen generator cannot be released to the atmosphere by the method described in Patent Document 2.

Here, Patent Document 1 proposes a fuel cell system in which a water sealing mechanism is provided on a passage by which the hydrogen generator and the heater are communicated with each other.

In accordance with the fuel cell system described in Patent Document 1, when the fuel cell system normally stops, the water sealing mechanism can seal the inside of the fuel cell system (hydrogen generator). In contrast, in a case where the internal pressure of the hydrogen generator is increased to a predetermined pressure or higher by the water evaporation at the time of the power outage, water sealing of the water sealing mechanism by a water head difference is automatically lost, and the internal gas can be discharged to the outside without the power supply. With this, the internal pressure of the hydrogen generator at the time of the power outage can be maintained at an appropriate level, and failures of the devices by the increase in the internal pressure of the hydrogen generator can be prevented.

Patent Document 1: Pamphlet of International Publication WO 2006/013917A1

Patent Document 2: Japanese Laid-Open Patent Application Publication 2005-243330

DISCLOSURE OF THE INVENTION

Problems to be Solved by the Invention

However, in the case of the hydrogen generator described in Patent Document 1, a carbon monoxide gas remaining in the hydrogen generator is contained in the gas discharged to the atmosphere when the water sealing of the water sealing mechanism is lost. In some cases, there is a possibility that carbon monoxide which exceeds an allowable concentration is discharged from the hydrogen generator.

Also, in the case of the hydrogen generator described in Patent Document 2, the carbon monoxide remaining in the hydrogen generator is discharged to the atmosphere when opening the on-off valve.

The present invention was made in view of these circumstances, and an object of the present invention is to provide a hydrogen generator capable of further suppressing the leakage of the carbon monoxide, remaining in the hydrogen generator, as compared to before in a case where the internal pressure of the hydrogen generator is depressurized due to the water evaporation at the time of at least one of the power outage and a normal stop operation in which the power supply is not cut.

Another object of the present invention is to provide a fuel cell system including the hydrogen generator.

Means for Solving the Problems

To solve the above problems, the present invention provides a hydrogen generator including: a reformer configured to generate a hydrogen-containing gas using a raw material and steam; a water evaporator configured to supply the steam to the reformer; a sealing device provided on a passage located downstream of the reformer and configured to block a gas in the passage from flowing to atmosphere; and a depressurizer provided on a passage located upstream of the reformer and configured to release to the atmosphere, pressure in the hydrogen generator which pressure is increased by water evaporation in the water evaporator after the sealing device is closed.

As above, by providing the depressurizer on the passage located upstream of the reformer, an internal pressure of the hydrogen generator can be released to an outside thereof while further suppressing the leakage of carbon monoxide, remaining in the hydrogen generator, as compared to before.

Moreover, the hydrogen generator of the present invention may be configured such that the depressurizer is provided on the passage which connects the water evaporator and the reformer.

In a case where the depressurizer is provided on the passage located upstream of the water evaporator or the passage which connects the reformer and the raw material supplier, a part of the raw material in the passage or a part of the water in the passage is discharged when releasing the internal pressure of the hydrogen generator. Therefore, there is a possibility that at the time of the next start-up, a time for the raw material supplied from the raw material supplier or the water supplied from the water supplier to reach the reformer becomes longer than usual. However, in the case of the above configuration, this possibility is reduced.

Moreover, the hydrogen generator of the present invention may be configured to further include a raw material supplier configured to supply the raw material to the reformer, wherein the depressurizer is provided on the passage which connects the raw material supplier and the reformer.

There is a possibility that in a case where the depressurizer is provided on the passage which connects the water supplier and the water evaporator, ions dissolved in the water in the passage deposit, and this causes malfunctions, such as fixation. However, in the case of the above configuration, this possibility is reduced.

Moreover, the hydrogen generator of the present invention may be configured such that the depressurizer is provided on the passage located upstream of the water evaporator.

With this configuration, the depressurizer is indirectly communicated with the reformer via the water evaporator. Therefore, as compared to a case where the depressurizer is directly communicated with the reformer, the release of the steam in the water evaporator is prioritized over the release of the hydrogen-containing gas in the reformer, so that the leakage of the carbon monoxide gas in the reformer can be further suppressed.

Moreover, as one example of the configuration in which the depressurizer is provided on the passage located upstream of the water evaporator, the hydrogen generator of the present invention may be configured to include a water supplier configured to supply water to the water evaporator, wherein the depressurizer is provided on the passage which connects the water supplier and the water evaporator.

There is a possibility that in a case where the depressurizer is provided on the passage which connects the raw material supplier and the water evaporator, the raw material in the passage is discharged to the outside of the hydrogen generator when releasing the internal pressure of the hydrogen generator. However, in the case of the above configuration, this possibility is reduced.

Moreover, as another example of the configuration in which the depressurizer is provided on the passage located upstream of the water evaporator, the hydrogen generator of the present invention may be configured to further include a raw material supplier configured to supply the raw material to the reformer, wherein the depressurizer is provided on the passage which connects the raw material supplier and the water evaporator.

There is a possibility that in a case where the depressurizer is provided on the passage which connects the water supplier and the water evaporator, ions dissolved in the water in the passage deposit, and this causes malfunctions, such as the fixation. However, in the case of the above configuration, this possibility is reduced.

Moreover, the hydrogen generator of the present invention may further include: a deodorizer configured to remove an odorous component in the raw material supplied to the reformer; and an on-off valve provided on a passage extending between the deodorizer and the reformer, wherein: the on-off valve is configured to block the gas from flowing from the reformer to the deodorizer when the sealing device is closed; and the depressurizer is provided between the deodorizer and the reformer.

The inflow of the steam to the deodorizer can be suppressed by the action of the on-off valve. As a result, the performance degradation of the deodorizer can be suppressed.

Moreover, in the hydrogen generator of the present invention, the sealing device may be a normally closed valve.

With this, since the sealing device automatically closes when the electric power supply to the hydrogen generator is cut, the discharge of the hydrogen-containing gas in the reformer from the downstream side of the reformer to the atmosphere is suppressed, which is preferable.

Moreover, in the hydrogen generator of the present invention, the depressurizer may be a valve including a relief mechanism capable of releasing the pressure in the hydrogen generator to the atmosphere in a case where the pressure in the hydrogen generator is a first upper limit pressure or higher.

With this, the internal pressure of the hydrogen generator can be released in a case where electrical control cannot be carried out due to the power outage, or the like.

Moreover, in the hydrogen generator of the present invention, the depressurizer may be a solenoid valve including a spring sealing mechanism and may be configured to cancel sealing of the spring sealing mechanism in a case where the pressure in the hydrogen generator is the first upper limit pressure or higher.

With this, in a case where the electric control cannot be carried out due to the power outage, or the like, and the gas pressure in the hydrogen generator is the first upper limit pressure or higher, the sealing of the spring sealing mechanism is automatically canceled, so that depressurizing can be appropriately executed.

Moreover, the hydrogen generator of the present invention may further include: a pressure detector configured to detect the pressure in the hydrogen generator sealed by the sealing device; and a control unit configured to cause the sealing device to release the pressure in the hydrogen generator to the atmosphere in a case where the pressure detected by the pressure detector is equal to or higher than a second upper limit pressure that is lower than the first upper limit pressure.

With this, the internal pressure of the hydrogen generator is released to the atmosphere before the pressure in the hydrogen generator becomes the first upper limit pressure or higher. Therefore, the deterioration of durability of the hydrogen generator with respect to the internal pressure can be suppressed.

Moreover, the hydrogen generator of the present invention may be configured such that during at least one of a start-up standby period of the hydrogen generator and a start-up operation of the hydrogen generator, the solenoid valve carries out an open-close operation once in at least one of a predetermined cumulative operating time, a predetermined cumulative number of times of operations, a predetermined period of time, and a predetermined consecutive start-up standby time.

This suppresses the fixation between a valve seat and a valve body (for example, rubber packing portions) of the spring sealing mechanism of the solenoid valve due to adhesion therebetween for a long period of time. Thus, it is possible to reduce the possibility that in a case where the internal pressure of the hydrogen generator is the first upper limit pressure or higher, the depressurizing function of the solenoid valve cannot be achieved.

Moreover, the hydrogen generator of the present invention may further include: a pressure detector configured to detect the pressure in the hydrogen generator sealed by the sealing device; and a control unit, wherein the control unit may cause the on-off valve to open in a case where the pressure detected by the pressure detector is a second upper limit pressure or higher.

Moreover, in the hydrogen generator of the present invention, the second upper limit pressure may be lower than the first upper limit pressure.

With this, the internal pressure of the hydrogen generator is released to the atmosphere before the pressure in the hydrogen generator becomes the first upper limit pressure or higher. Therefore, the deterioration of durability of the hydrogen generator with respect to the internal pressure can be suppressed.

Moreover, the hydrogen generator of the present invention may further include: a falling slope passage through which the gas discharged from the depressurizer is introduced downward; and a receiver configured to receive the water discharged from a lower end of the falling slope passage.

With this, it is possible to reduce the possibility that the gas containing a large amount of steam discharged from the depressurizer is directly discharged, and this causes the deterioration and malfunction of the other components constituting the hydrogen generator. Moreover, the volume of the gas decreases by the steam condensation while the gas is flowing through the falling slope passage or in the receiver. Therefore, rapid gas discharge to the outside can be suppressed.

Moreover, the hydrogen generator of the present invention may be configured such that: the receiver includes a water storing portion configured to store the water and a discharging mechanism configured to discharge the water stored in the water storing portion; and condensed water is wasted to an outside of the hydrogen generator by discharging the water using the discharging mechanism.

Moreover, in the hydrogen generator of the present invention, the receiver may include a releasing structure capable of releasing to the atmosphere the gas discharged from the lower end of the falling slope passage.

With this, in the receiver, the gas pressure discharged from the inside of the hydrogen generator is released to the atmosphere.

The present invention also provides a fuel cell system including a fuel cell configured to generate electric power by using the gas.

As above, since the fuel cell system includes as a standard component the receiver (such as a hopper or a water tank) capable of discharging to the outside of the system the water discharged from respective components (such as the hydrogen generator and the fuel cell) constituting the fuel cell system, the configuration for discharging the condensed water to the outside can be simplified by utilizing the receiver.

The above object, other objects, features and advantages of the present invention will be made clear by the following detailed explanation of preferred embodiments with reference to the attached drawings.

Effects of the Invention

The present invention can provide a hydrogen generator capable of depressurizing the inside of the hydrogen generator at the time of the stop of the hydrogen generator while further suppressing the leakage of the carbon monoxide, remaining in the inside of the hydrogen generator, as compared to before. In addition, the present invention can provide a fuel cell system including the hydrogen generator.

Figure 1:
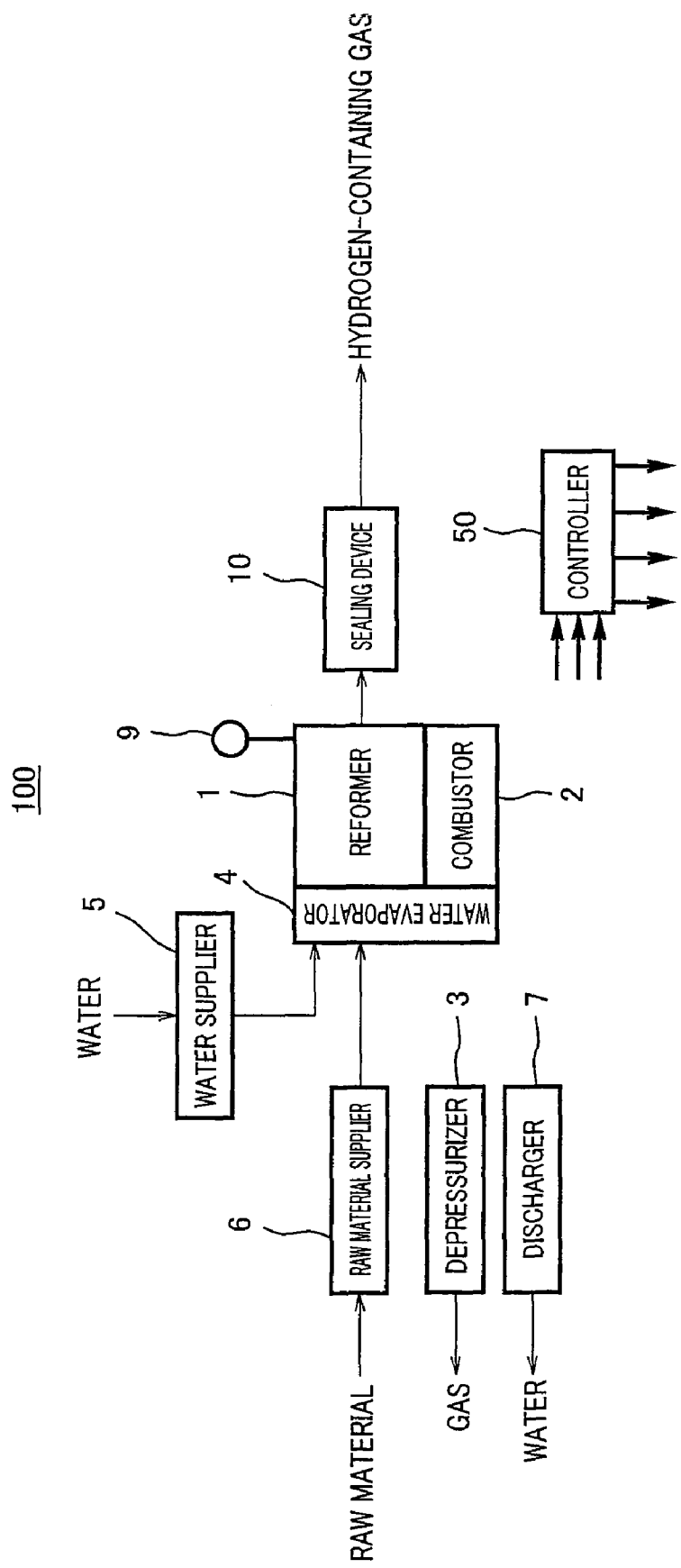
FIG. 1 is a block diagram schematically showing a configuration example of a hydrogen generator in Embodiment 1 of the present invention.

EXPLANATION OF REFERENCE NUMBERS 1 reformer
2 combustor
3 depressurizer
4 water evaporator
5 water supplier
6 raw material supplier
7 discharger
8 fuel cell
9 pressure detector
10, 10A, 10B, 10C sealing device
22 condensed water tank
25 wall portion
26 hopper
26A discharging function
26B water storing portion
22C, 26C releasing structure
27, 27A falling slope passage
30 desulfurizer
31 steam backflow prevention valve (on-off valve)
32 falling slope pipe
33 horizontal pipe
50 controller
100 hydrogen generator
110, 110A fuel cell system

BEST MODE FOR CARRYING OUT THE INVENTION

Hereinafter, best embodiments for carrying out the present invention will be explained in detail in reference to the drawings.

Embodiment 1

FIG. 1 is a block diagram schematically showing a configuration example of a hydrogen generator in Embodiment 1 of the present invention. FIG. 1 shows only components necessary for explaining a hydrogen generator 100 of the present embodiment and does not show components not directly related to the explanation of the present embodiment.

As shown in FIG. 1, the hydrogen generator 100 of the present embodiment includes a reformer 1.

The reformer 1 is a device which includes a reforming catalyst body (not shown) for causing a steam-reforming reaction to proceed and can generate a hydrogen-containing gas from a hydrocarbon-based raw material, such as a city gas, LPG, or kerosene, and water. In a case where the hydrogen generator 100 is incorporated in a fuel cell system, the hydrogen-containing gas supplied from the reformer 1 is utilized as a reactant gas of a fuel cell.

As one example of a pressure detector configured to detect the pressure in the hydrogen generator, a pressure detector 9 capable of detecting the pressure in the reformer 1 is provided for the reformer 1. The pressure detector 9 may be a pressure gauge configured to directly detect the pressure of the gas in the reformer 1 or a temperature detector capable of indirectly detecting the pressure of the gas in the reformer 1. For example, to detect the temperature of the reformer 1, the reformer 1 is normally provided with a temperature detector configured to detect the temperature of the reforming catalyst body, the temperature of a casing around the reforming catalyst body, or the temperature of the hydrogen-containing gas having flowed through the reforming catalyst body. The pressure of the gas in the hydrogen generator can be estimated based on the temperature detected by the temperature detector. As the temperature detector, a thermocouple can be used. However, any temperature detector may be used as long as it can appropriately detect the temperature of the reformer 1.

Moreover, if the pressure of the gas in the hydrogen generator 100 and the time elapsed after the operation stop of the hydrogen generator 100 are correlated with each other, the pressure of the gas can be estimated by using a suitable timing device (timer) as the pressure detector configured to indirectly detect the pressure of the gas.

To be specific, the "pressure detector" in the present specification is not limited to the pressure gauge, such as a diaphragm, and may be constituted by each of various detectors capable of directly or indirectly detecting the pressure of the gas.

As shown in FIG. 1, the hydrogen generator 100 includes a water supplier 5 and a water evaporator 4.

The water evaporator 4 is a device capable of evaporating the water supplied from an outside thereof. The water evaporator 4 generates steam necessary for the steam-reforming reaction of the reformer 1.

FIG. 1 shows an example in which the water evaporator 4 and the reformer 1 are integrally formed. However, the water evaporator 4 and the reformer 1 may be separately formed and be coupled to each other by a pipe. In this case, the water is evaporated outside the reformer 1, and the steam is supplied to the reformer 1.

A heat energy necessary for the water evaporation in the water evaporator 4 may be supplied from an outside of the hydrogen generator 100. However, it is preferable to utilize remaining heat of a heat medium (below-described flue gas) used for heating the reformer 1, since this can improves an energy efficiency. For example, the energy efficiency of the hydrogen generator 100 can be improved by configuring the hydrogen generator 100 such that the reformer 1 and the water evaporator 4 are integrally formed via a suitable dividing member (not shown) to transfer the heat of the flue gas (described below) to both the reformer 1 and the water evaporator 4.

The water supplier 5 is a device capable of adjusting the amount of water supplied to the water evaporator 4. For example, a water pump can be used as the water supplier 5. However, any device other than the water pump can be used as long as it can adjust the amount of water supplied to the water evaporator 4.

As shown in FIG. 1, the hydrogen generator 100 includes a combustor 2 as a heating device configured to heat the reformer 1.

Since the steam-reforming reaction in the reforming catalyst body of the reformer 1 is an endothermic reaction, heat needs to be applied to the reforming catalyst body to cause the reaction to proceed. Therefore, the combustor 2 is configured to heat the reforming catalyst body. As the combustor 2, a combustion burner can be used. With this, the heat of the high-temperature flue gas generated in the combustor 2 is applied to the reforming catalyst body to heat the reforming catalyst body to a temperature suitable for the steam-reforming reaction. A heating device other than the combustion burner may be used to heat the reformer 1.

As a combustion fuel of the combustion burner, the raw material supplied to the reformer 1 can be used. However, the other combustible fuel (for example, a part of the hydrogen-containing gas generated by the reformer 1) may be used.

As shown in FIG. 1, the hydrogen generator 100 includes a raw material supplier 6.

The raw material supplier 6 is a device configured to adjust the flow rate of the raw material (herein, a material gas, such as a city gas) supplied to the reformer 1. For example, a booster pump can be used as the raw material supplier 6. However, any device, such as a flow rate control valve, other than the booster pump may be used as long as it can adjust the amount of the raw material supplied to the reformer 1.

In FIG. 1, the raw material is supplied from the raw material supplier 6 to the water evaporator 4, and the water is supplied from the water supplier 5 to the water evaporator 4. The raw material and the steam are mixed in the water evaporator 4. Then, this mixture gas is supplied from the water evaporator 4 to the reformer 1. However, a method for supplying the mixture gas to the reformer 1 is not limited to this. For example, a destination to which the raw material supplier supplies the raw material may be communicated with a passage extending between the water evaporator and the reformer (see FIG. 2(*b*) described below). In this case, the raw material and the steam having flowed out from the water evaporator are mixed with each other in the passage extending between the water evaporator and the reformer.

As shown in FIG. 1, the hydrogen generator 100 includes a sealing device 10.

The sealing device 10 is a device capable of blocking a communication between the passage including the reformer 1 located upstream of the position of the sealing device 10 and the atmosphere. Herein, the sealing device 10 is provided on a passage located downstream of the water evaporator 4 and a depressurizer 3 (details thereof will be described below). To be specific, as shown in FIG. 1, the sealing device 10 is provided on the passage which is located downstream of the reformer 1 and through which the hydrogen-containing gas flowing out from the reformer 1 flows. A downstream end of this hydrogen-containing gas passage is communicated with the atmosphere.

For example, the sealing device 10 can be constituted by a solenoid valve (solenoid on-off valve) provided on a pipe constituting a gas passage.

As shown in FIG. 1, the hydrogen generator 100 includes a controller 50.

The controller 50 is constituted by a microprocessor, or the like, and appropriately controls various operations of the hydrogen generator 100. The controller 50 may be a single control unit as shown in FIG. 1, or may be a group of a plurality of control units which cooperate with one another.

Next, the configurations of the depressurizer 3 and a discharger 7 that are features of the hydrogen generator 100 of the present embodiment will be explained.

The depressurizer 3 of the hydrogen generator 100 is configured to release an internal gas (herein, a gas containing the steam as a major component) of the hydrogen generator 100 to the atmosphere to reduce internal pressure of the hydrogen generator 100 in a case where the internal pressure of the hydrogen generator 100 is increased to a first upper limit pressure or higher by, for example, the expansion of the volume of the steam. The first upper limit pressure is defined as a value smaller than the upper limit of the withstanding pressure of the hydrogen generator 100.

The depressurizer 3 is provided on the passage located upstream of at least the reformer 1 to further suppress the leakage of carbon monoxide, remaining in the reformer 1, to the outside (atmosphere) of the hydrogen generator 100 as compared to before, and to appropriately depressurize the inside of the hydrogen generator 100. A specific position of the depressurizer 3 changes depending on the method for supplying the mixture gas of the raw material and the steam to the reformer 1. A specific example of the position of the depressurizer 3 will be described below.

As the depressurizer 3, an escape valve (relief valve) of a simple pressure escape mechanism (relief mechanism) utilizing sealing of a spring pressure can be used. With this, the depressurizer 3 can be simply configured. Moreover, the depressurizer 3 can be configured by using the solenoid valve provided in such a direction as to function as the pressure escape mechanism (relief mechanism).

In the case of constituting the depressurizer 3 by the solenoid valve, the solenoid valve is provided on the gas passage in such a direction as to automatically open in a case where the internal pressure of the hydrogen generator 100 is the first upper limit pressure (set pressure of a spring sealing mechanism of the solenoid valve) or higher, and automatically close in a case where the pressure decreases.

With this, in a case where the increase in the internal pressure of the hydrogen generator 100 with the sealing device 10 closed is not excessive, the internal pressure of the hydrogen generator 100 is maintained to be equal to or lower than a spring pressure (set pressure) of the spring sealing mechanism of the solenoid valve, and the inside of the hydrogen generator 100 is sealed by the spring sealing mechanism of the solenoid valve. In contrast, in a case where the increase in the internal pressure of the hydrogen generator 100 with the sealing device 10 closed is excessive (in a case where the internal pressure of the hydrogen generator 100 is the first upper limit pressure or higher), the internal pressure of the hydrogen generator 100 becomes equal to or higher than the spring pressure (set pressure) of the spring sealing mechanism of the solenoid valve, and the inside of the hydrogen generator 100 is temporarily open to the atmosphere by canceling the spring sealing mechanism of the solenoid valve (by forming a gap, through which the internal gas flows out, by the internal pressure which presses the spring). With this, the internal pressure of the hydrogen generator 100 can be decreased to a pressure level lower than the first upper limit pressure.

Further, in at least one of (i) a start-up standby period from when a stop operation of the hydrogen generator 100 is completed to when a next start-up operation starts and (ii) a start-up operation before starting supplying the water to the water evaporator 4, the solenoid valve constituting the depressurizer 3 is forcibly caused to carry out an open-close operation at least once by the controller 50 from a state where the solenoid valve is closed. This suppresses fixation between a valve seat and a valve body (for example, rubber packing portions) of the spring sealing mechanism of the solenoid valve due to adhesion therebetween for a long period of time. Thus, it is possible to reduce the possibility that in a case where the internal pressure of the hydrogen generator 100 is abnormally increased, a depressurizing function of the solenoid valve cannot be achieved due to the fixation.

A timing at which the solenoid valve is forcibly caused to carry out the open-close operation in any one of the start-up standby period and the start-up operation before starting supplying the water to the water evaporator 4 may be any timing as long as it is before the start of the fixation of the spring sealing mechanism of the solenoid valve. For example, the solenoid valve is forcibly caused to periodically carry out the open-close operation once in at least one of a predetermined cumulative operating time (50 hours for example) of the hydrogen generator 100, a predetermined cumulative number of times of operations (predetermined cumulative number of starts, predetermined cumulative number of stops; for example, eight starts) of the hydrogen generator 100, a predetermined period of time (one week for example), and a predetermined consecutive start-up standby time (one week for example).

Here, if the high-temperature gas (gas containing the steam as the major component; hereinafter may be abbreviated as "steam" according to need) is discharged from the depressurizer 3 to the atmosphere, various problems may occur (for example, a device may malfunction since the device is exposed to the high-temperature steam).

In the present embodiment, the discharger 7 is provided, which is communicated with the depressurizer 3 via a passage (hereinafter referred to as "falling slope passage"; not shown) through which the high-temperature gas is introduced downward. The discharger 7 serves as a receiver configured to receive condensed water discharged from a lower end of the falling slope passage and be able to discharge the condensed water to the outside. With this, the gas containing the high-temperature steam is cooled down while it flows through the falling slope passage and is in the discharger 7, and is discharged (wasted to the outside of the hydrogen generator 100) as the condensed water from the discharger 7. Thus, in the present embodiment, the gas discharged from the depressurizer 3 is prevented from contacting the components of the hydrogen generator 100 which components may deteriorate by the contact with the high-temperature gas (steam).

Moreover, the pipe constituting the above-described falling slope passage does not have to have a falling slope over the entire length as long as it can achieve a drainage performance of the pipe. To be specific, a heat exchange portion including a horizontal portion and a complex pipe system may be incorporated into a portion of the pipe.

Moreover, to discharge the gas pressure, discharged from the depressurizer 3, to the atmosphere, it is preferable that the discharger 7 include an atmosphere opening separately from a drainage opening for drainage.

Next, specific examples of the position of the depressurizer 3 will be explained in reference to the drawings.

Figure 2:
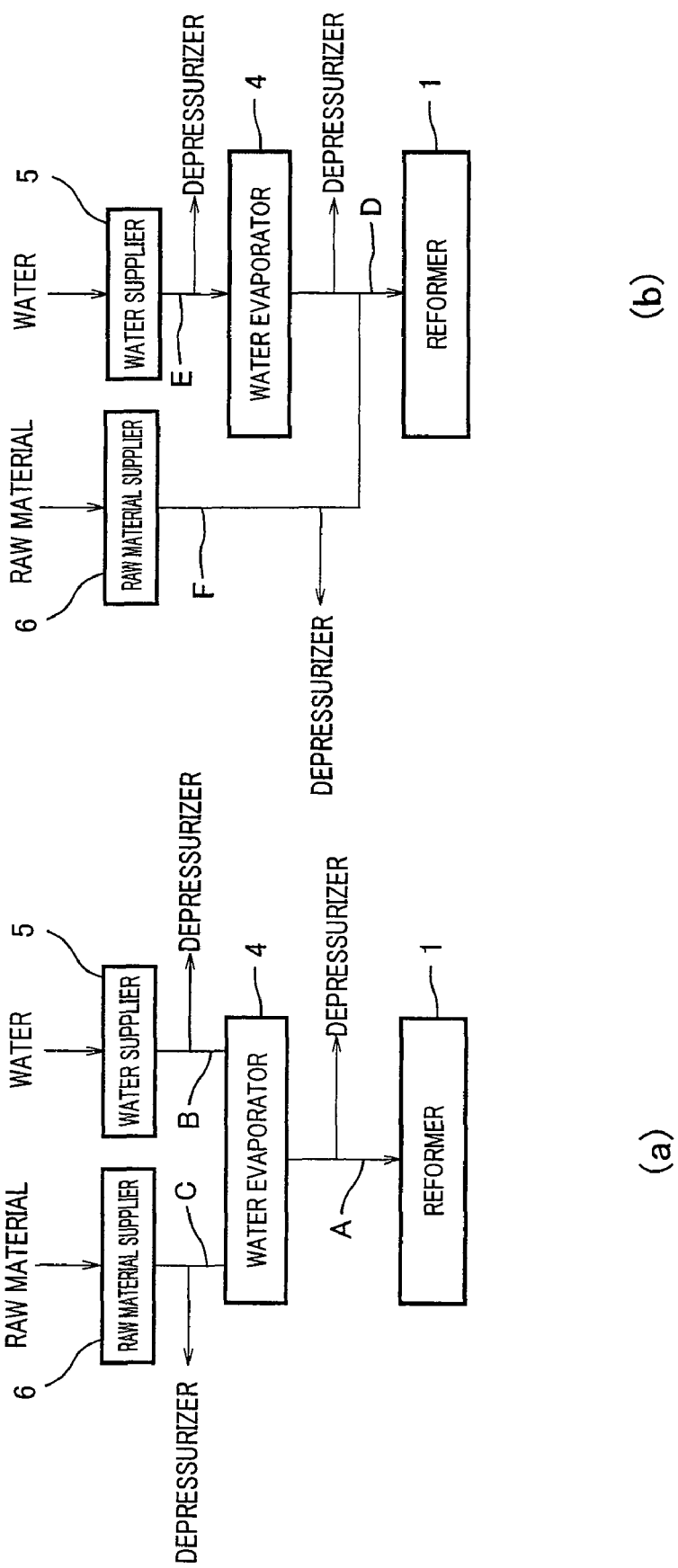
FIG. 2 are diagrams showing a specific example of the position of a depressurizer.

FIG. 2 are diagrams showing specific examples of the position of the depressurizer. FIG. 2(a) shows the positions at which the depressurizer 3 can be provided in the configuration in which the raw material and the steam are mixed in the water evaporator 4 to supply the mixture gas to the reformer 1. FIG. 2(b) shows the positions at which the depressurizer 3 can be provided in the configuration in which the raw material and the steam having flowed out from the water evaporator 4 are mixed in the passage communicated with the reformer 1 to supply the mixture gas to the reformer 1.

In the former case (FIG. 2(a)), the depressurizer 3 may be provided on a passage A extending between the water evaporator 4 and the reformer 1. In a case where the depressurizer 3 is provided on the passage located upstream of the water evaporator 4, a part of the raw material in the passage or a part of the water in the passage is discharged when releasing the internal pressure of the hydrogen generator 100. Therefore, there is a possibility that at the time of the next start-up, a time for the raw material supplied from the raw material supplier 6 or the water supplied from the water supplier 5 to reach the reformer 1 becomes longer than usual. However, in the case of the present configuration, such problem is less likely to occur.

Moreover, the depressurizer 3 may be provided on the passage located upstream of the water evaporator 4. With this, since the depressurizer 3 is indirectly communicated with the reformer via the water evaporator 4, the leakage of the gas (carbon monoxide) in the reformer 1 when releasing the internal pressure of the hydrogen generator 100 by the depressurizer 3 can be suppressed more than the case where the depressurizer 3 is provided on the passage A which connects the water evaporator 4 and the reformer 1.

One example of the passage located upstream of the water evaporator 4 is a passage B extending between the water supplier 5 and the water evaporator 4. There is a possibility that in a case where the depressurizer 3 is provided on a passage C, the combustible raw material in the passage C is discharged to the outside of the hydrogen generator 100 when releasing the internal pressure of the hydrogen generator 100. However, in a case where the depressurizer 3 is provided on the passage B, this possibility is reduced.

Another example of the passage located upstream of the water evaporator 4 is the passage C extending between the raw material supplier 6 and the water evaporator 4. There is a possibility that in a case where the depressurizer 3 is provided on the passage B, ions dissolved in the water in the passage B deposit, and this causes malfunctions, such as the fixation. However, in a case where the depressurizer 3 is provided on the passage C, this possibility is reduced.

In the latter case (FIG. 2(b)), the depressurizer 3 may be provided on a passage D extending between the water evaporator 4 and the reformer 1. In a case where the depressurizer 3 is provided on a passage E located upstream of the water evaporator 4 or a passage F which connects the reformer 1 and the raw material supplier 6, a part of the raw material in the passage or a part of the water in the passage is discharged when releasing the internal pressure of the hydrogen generator 100. Therefore, there is a possibility that at the time of the next start-up, a time for the raw material supplied from the raw material supplier 6 or the water supplied from the water supplier 5 to reach the reformer 1 becomes longer than usual. However, in the case of the present configuration, this possibility is reduced.

Moreover, the depressurizer 3 may be provided on the passage located upstream of the water evaporator 4. With this, since the depressurizer 3 is indirectly communicated with the reformer via the water evaporator 4, the leakage of the gas (carbon monoxide) in the reformer 1 when releasing the internal pressure of the hydrogen generator 100 by the depressurizer 3 can be suppressed more than the case where the depressurizer 3 is provided on the passage D which connects the water evaporator 4 and the reformer 1.

One example of the passage located upstream of the water evaporator 4 is the passage E which connects the water supplier 5 and the water evaporator 4. There is a possibility that in a case where the depressurizer 3 is provided on the passage F, the combustible raw material in the passage F is discharged to the outside of the hydrogen generator 100 when releasing the internal pressure of the hydrogen generator 100. However, in a case where the depressurizer 3 is provided on the passage E, this possibility is reduced.

Moreover, the depressurizer 3 may be provided on the passage F extending between the raw material supplier 6 and the reformer 1. There is a possibility that in a case where the depressurizer 3 is provided on the passage E, ions dissolved in the water in the passage E deposit, and this causes malfunctions, such as the fixation. However, in a case where the depressurizer 3 is provided on the passage F, this possibility is reduced.

For ease of explanation of the position of the depressurizer 3, FIG. 2 show that the reformer 1 and the water evaporator 4 are separately formed. However, as described above, it is preferable that the reformer 1 and the water evaporator 4 be integrally formed.

Next, operations (herein, a start-up operation and a normal stop operation) of the hydrogen generator 100 of the present embodiment will be explained.

In the start-up operation of the hydrogen generator 100, the reformer 1 is heated by the combustor 2 such that a temperature thereof is increased to a temperature suitable for generation of the hydrogen-containing gas. To heat the reformer 1, the raw material having been supplied through the reformer 1 to the combustor 2 is combusted in the combustor 2. A passage through which the raw material having flowed through the reformer 1 is supplied to the combustor 2 is realized by connecting the downstream end of the hydrogen-containing gas passage shown in FIG. 1 to the combustor 2. The reason why the raw material is caused to flow through the reformer 1 is because the raw material heated by the combustion heat of the combustor 2 is used as a heat medium for increasing the temperature of the hydrogen generator 100. Therefore, the raw material may be directly supplied to the combustor 2 without being supplied through the reformer 1. In a case where the raw material in the reformer 1 is heated to a predetermined temperature or higher without the water, the deposition of carbon contained in the raw material as a constituent element occurs, this clogs the passage of the reformer 1, and therefore, the reforming catalyst body deteriorates. On this account, it is necessary to start supplying the steam to the reformer 1 when the temperature of the reformer 1 is lower than the predetermined temperature.

In the present embodiment, since the water is converted into the steam using the heat of the combustor 2, the heat extracted from the combustor 2 is applied to the reformer 1 and the water evaporator 4 such that in a state where the temperature of the reformer 1 is lower than the predetermined temperature, the water evaporator 4 is increased to a temperature at which the water can be evaporated.

In the present embodiment, the temperature at which the deposition of carbon from the raw material occurs is set to 400° C. However, this set temperature changes depending on the configuration of the reformer 1 and the position of the temperature detector. Therefore, any temperature other than the above-described set temperature may be used as long as it does not cause the deposition of carbon.

By supplying the raw material and the steam to the reformer 1, the reformer 1 starts generating the hydrogen-containing gas by the steam-reforming reaction. The concentration of hydrogen and the concentration of carbon monoxide in the gas generated in the reformer 1 by the reforming reaction change depending on the temperature of the reforming catalyst body. Therefore, after the temperature in the reformer 1 is adequately increased, and the highly-concentrated hydrogen in the hydrogen-containing gas starts to be generated, the start-up operation is completed. Then, the hydrogen-containing gas starts to be supplied to devices (fuel cell, hydrogen tank, and the like) utilizing the hydrogen-containing gas. The present embodiment has adopted a mode in which only the reformer 1 is provided as a reactor in the hydrogen generator 100. However, in a case where the carbon monoxide concentration needs to be further reduced in the devices utilizing the hydrogen-containing gas, the present embodiment may adopt a mode in which a reactor (shift converter, or the like) configured to reduce the carbon monoxide may be provided downstream of the reformer 1.

In the normal stop operation in which the electric power supply to the hydrogen generator 100 is not cut by power outage, a breaker, or the like, the supply of the raw material and the supply of the water to the hydrogen generator 100 are cut, and the combustion operation of the combustor 2 is stopped, so that the operation of the hydrogen generator 100 is stopped.

Here, immediately after the operation of the hydrogen generator 100 is stopped, respective portions of the hydrogen generator 100 are high in temperature. At this time, there is a possibility that if the catalyst body, such as the reforming catalyst body, contacts the air, the oxidative degradation of the catalyst body occurs. For the purpose of appropriately preventing the oxidative degradation of the catalyst, the input portions of the hydrogen generator 100 are blocked, and the output portions (for example, the sealing device 10 as the on-off valve) of the hydrogen generator 100 are closed. Thus, with the hydrogen-containing gas existing in the hydrogen generator 100, the inside of the hydrogen generator 100 is sealed.

Immediately after the operation of the hydrogen generator 100 is stopped, the water remains in the water evaporator 4. If such remaining water is evaporated by remaining heat of the water evaporator 4, the internal pressure of the hydrogen generator 100 increases. In a case where the internal pressure is excessively increased, the internal pressure may be released via the depressurizer 3. However, in consideration of the durability of the depressurizer 3 and the reduction in the pressure applied to the components of the hydrogen generator 100, the hydrogen generator 100 is suitably depressurized in a case where the internal pressure is equal to or higher than a second upper limit pressure that is lower than the first upper limit pressure. The present embodiment is set such that when the internal pressure of the hydrogen generator 100 is increased to 3 kPa or higher, a depressurizing operation in which the sealing of the sealing device 10 is canceled by the controller 50 to cause the hydrogen generator 100 to be communicated with the atmosphere is executed. However, since the withstanding pressures of the devices are different from one another depending on the characteristics of the devices, a pressure threshold for executing the depressurizing operation does not have to be 3 kPa but may be the other value. Moreover, the internal pressure of the hydrogen generator 100 is released by the above depressurizing operation when it is lower than that released by the above depressurizing via the depressurizer 3. This is preferable since the amount of gas discharged from the hydrogen generator 100 at once is reduced, and rapid gas discharge is suppressed.

Here, for example, in a case where the downstream end of the hydrogen-containing gas passage shown in FIG. 1 is connected to the combustor 2, the gas in the hydrogen generator 100 is released to the combustor 2 by temporarily opening the sealing device 10 (on-off valve), so that the internal pressure of the hydrogen generator 100 can be depressurized through a flue gas passage (not shown) through which a flue gas discharged from the combustor 2 flows and which is communicated with the atmosphere. When releasing the gas to the combustor 2, an air supplier (not shown) capable of supplying the combustion air to the combustor 2 may be activated. With this, even if the gas released to the combustor 2 contains the hydrogen-containing gas, the combustible gas, such as hydrogen, and the carbon monoxide are appropriately diluted by the air in the combustor 2, and then discharged to the atmosphere. In this case, it is preferable that to adequately dilute and reduce the combustible gas and the carbon monoxide contained in the released gas, the amount of air supplied from the air supplier be adjusted to be larger than the amount of air supplied during a hydrogen supplying operation of the hydrogen generator 100. A sirocco fan can be used as the air supplier, but any air supplier can be used as long as it can supply the air.

After the operation of the hydrogen generator 100 is stopped, the temperatures of respective portions of the hydrogen generator 100 gradually decrease with time. For example, while the reformer 1 is operating, the internal temperature of the reformer 1 is increased to about 650° C. Therefore, the internal gas of the reformer 1 contracts as the internal temperature of the reformer 1 decreases. Then, the internal pressure of the hydrogen generator 100 also decreases. Therefore, the internal pressure of the hydrogen generator 100 which pressure has been increased by the volume expansion of the water evaporated by the remaining heat of the hydrogen generator 100 (especially, the water evaporator 4, and the reformer 1, the flue gas passage, and the like capable of transferring heat to the water evaporator 4) needs to be released by the depressurizing operation for a while after the operation of the hydrogen generator 100 is stopped. However, when the temperature in the hydrogen generator 100 becomes a predetermined temperature (for example, 300° C.) or lower, the internal pressure of the hydrogen generator 100 is decreased to a negative pressure that is lower than the atmospheric pressure. If the internal pressure of the hydrogen generator 100 becomes an excessive negative pressure, a load is applied to various devices (such as the solenoid valve and the gas passages) of the hydrogen generator 100, and this becomes a cause of malfunction of the devices. Here, for the purpose of preventing the internal pressure of the hydrogen generator 100 from becoming the excessive negative pressure, when the internal pressure of the hydrogen generator 100 becomes lower than a predetermined pressure, the hydrogen generator 100 is pressurized, so that the internal pressure of the hydrogen generator 100 is maintained to be equal to or higher than the predetermined pressure. Such pressurizing is realized by supplying the raw material to the hydrogen generator 100. Specifically, raw material supply sources, such as a raw material infrastructure (city gas for example) and a raw material tank (propane bomb for example), usually have supply pressure. Therefore, by opening an on-off valve (not shown) provided on a raw material supplying passage, the reduction in the volume of the gas contracted in the hydrogen generator 100 by the temperature decrease is compensated. The present embodiment is configured such that the pressurizing operation is carried out when the internal pressure of the hydrogen generator 100 becomes equal to or lower than the atmospheric pressure plus 0.3 kPa. However, since the withstanding pressures of the devices are different depending on the characteristics of the devices, the other condition may be adopted as long as it does not cause the malfunction of the devices.

As a method for cooling down the reformer 1 (hydrogen generator 100) after the combustion operation of the combustor 2 is stopped, there are two methods: one is a method for executing as one step of the stop operation a cooling operation of forcibly cooling down the reformer 1 by activating the air supplier (sirocco fan) to supply the air to the flue gas passage; the other is a natural cooling method without executing the above forcible cooling operation. The present embodiment adopts the former method. However, the latter method or the other cooling method may be adopted as long as it can maintain the internal pressure of the hydrogen generator 100 within a predetermined range. The depressurizing operation and the pressurizing operation are suitably executed in at least one of the stop operation of the hydrogen generator 100 or the start-up standby period of the hydrogen generator 100.

Next, the following will describe the stop operation in a case where the electric power supply to the hydrogen generator 100 is cut by the power outage, the breaker, or the like during the start-up operation of the hydrogen generator 100 or the hydrogen supplying operation of the hydrogen generator 100 (the stop operation in an abnormal case).

In a case where the electric power supply to the hydrogen generator 100 is cut, all of various normally closed valves (solenoid valves configured to close by solenoid demagnetization and open by solenoid excitation) capable of opening and closing the input portions and output portions of the hydrogen generator 100 are closed. At the same time, the suppliers, such as the raw material supplier 6 and the water supplier 5, stop operating. The normally closed valves configured to open and close the output portions include the sealing device 10.

Here, for a while after the water supplier 5 stops operating, the water remaining in the pipe extending from the water supplier 5 to the water evaporator 4 and the water in the water evaporator 4 continue to be evaporated by the remaining heat of the hydrogen generator 100 (especially, the water evaporator 4, and the reformer 1, the flue gas passage, and the like capable of transferring heat to the water evaporator 4). Therefore, the steam is continuously generated in the hydrogen generator 100. Because of the volume expansion caused by the generation of the steam, the internal pressure of the hydrogen generator 100 sealed by the sealing device 10 increases.

It is preferable that in a case where the internal pressure of the hydrogen generator 100 is increased to the second upper limit pressure or higher, the depressurizing operation of the hydrogen generator 100 be carried out by the controller 50. However, the electric power supply to the hydrogen generator 100 is being cut by the power outage, the breaker, or the like, so that the controller 50 cannot open or close the sealing device 10. To be specific, the depressurizing operation using the sealing device 10 cannot be carried out.

In the present embodiment, in a case where the gas pressure in the hydrogen generator 100 is excessively increased to the first upper limit pressure (herein, 50 kPa) or higher, the water evaporator 4 and the atmosphere are communicated with each other by the relief mechanism of the depressurizer 3, so that the internal pressure of the hydrogen generator 100 is released to the atmosphere. Here, the hydrogen generator 100 of the present embodiment is configured such that by providing the depressurizer 3 on the passage located upstream of the reformer 1, the steam that is a cause of the increase in the internal pressure of the hydrogen generator 100 can be successfully released to the outside while further suppressing the leakage of the hydrogen-containing gas (carbon monoxide), remaining in the hydrogen generator 100, as compared to before. Herein, the first upper limit pressure is set to 50 kPa. However, the withstanding pressures of the devices are different from one another depending on the characteristics of the devices, so that the other value may be adopted as the first upper limit pressure as long as it does not cause the malfunction of the devices.

In the device in which the reformer 1 and the water evaporator 4 are integrally formed as in the present embodiment (FIG. 1), it is favorable to provide the depressurizer 3 on the passage located upstream of the reformer 1 and the water evaporator 4. With this, the steam can be preferentially discharged, and the release of the hydrogen-containing gas (carbon monoxide gas) can be further suppressed as compared to before. Meanwhile, in a case where the reformer 1 and the water evaporator 4 are separately formed and are coupled to each other by a suitable pipe, the depressurizer 3 may be provided on the pipe extending between the reformer 1 and the water evaporator 4.

Moreover, if the high-temperature steam is cooled down, the steam condenses into the water, so that the volume of the gas to be released to the outside can be contracted. Therefore, in the present embodiment, the gas having flowed through the depressurizer 3 is not directly discharged to the atmosphere, but flows through the above-described falling slope passage to be introduced into the discharger 7 together with the condensed water generated by cooling down the steam.

By using as the discharger 7 a receiver which is included in the hydrogen generator 100 as a standard component and includes a water storing portion and a discharge mechanism configured to discharge the water stored in the water storing portion, the configuration for discharging the condensed water to the outside of the hydrogen generator 100 can be simplified. As will be described in Embodiment 2, examples of the receiver as the standard component are a condensed water tank configured to store the water recovered from the flue gas of the combustor 2 and a hopper provided outside a wall portion constituting the casing (not shown) of the hydrogen generator 100.

Embodiment 2

Figure 3:
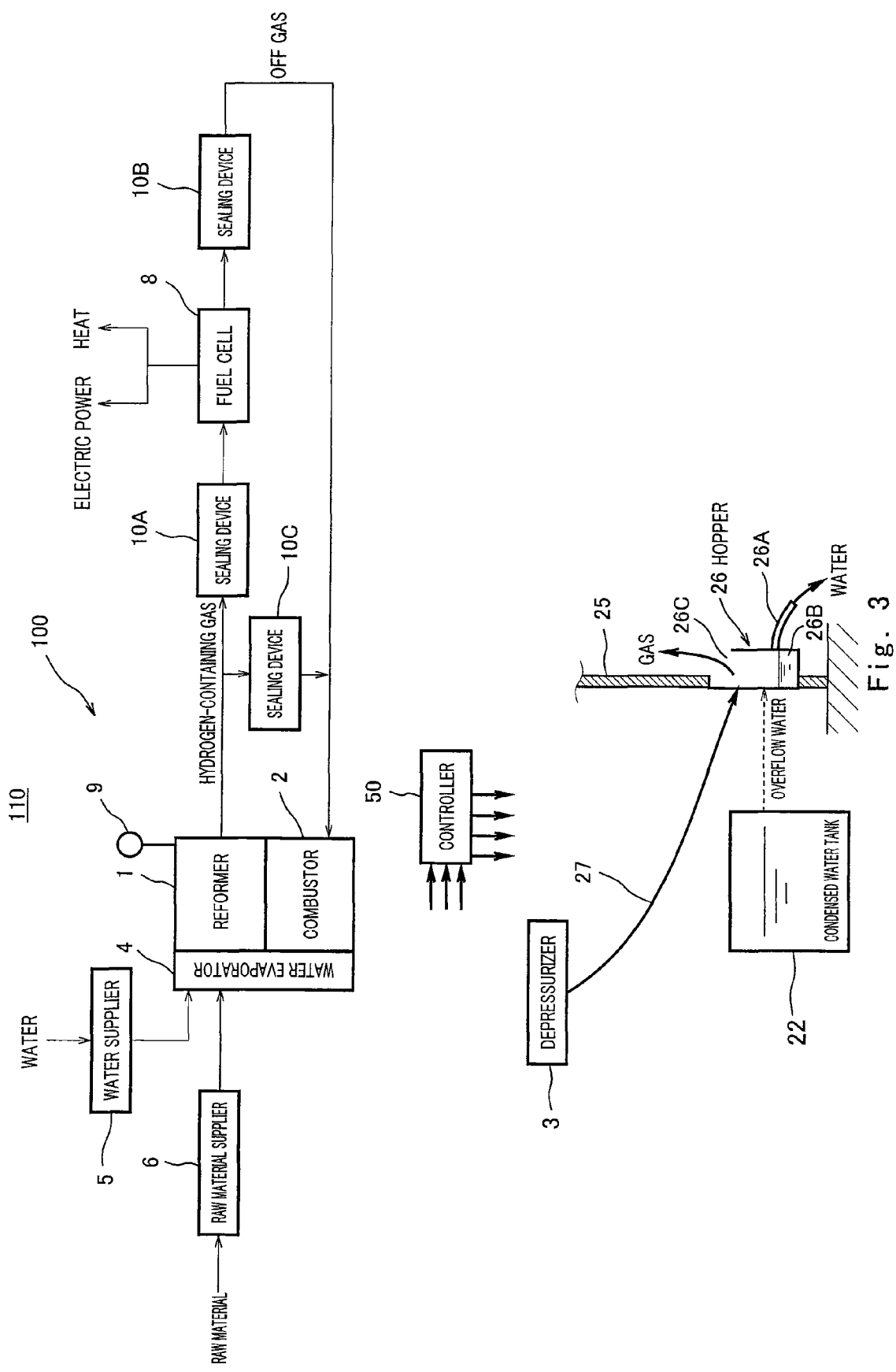
FIG. 3 is a block diagram schematically showing a configuration example of a fuel cell system in Embodiment 2 of the present invention.

FIG. 3 is a block diagram schematically showing a configuration example of the fuel cell system in Embodiment 2 of the present invention.

As shown in FIG. 3, the hydrogen generator 100 (the explanations of the configuration and operation thereof are omitted) described in Embodiment 1 is incorporated in a fuel cell system 110 of the present embodiment. In the present embodiment, the discharger 7 (see FIG. 1) of the hydrogen generator 100 is constituted by a below-described hopper 26, and the sealing device 10 (see FIG. 1) of the hydrogen generator 100 is constituted by below-described sealing devices 10A, 10B, and 10C.

As shown in FIG. 3, the fuel cell system 110 includes a fuel cell 8 configured to generate electric power using the hydrogen-containing gas supplied from the hydrogen generator 100 and the oxygen contained in the air (oxidizing gas). Since the internal configuration of the fuel cell 8 is known, an explanation thereof is omitted.

Although not shown in FIG. 3, a passage through which the air is supplied to the fuel cell 8 is formed. The air as the oxidizing gas is supplied from, for example, a blower through the above passage to the fuel cell 8. Moreover, since the concentration of the carbon monoxide in the hydrogen-containing gas having flowed through the reformer 1 is high in the start-up operation of the fuel cell system 110, the hydrogen-containing gas from the hydrogen generator 100 is supplied to not the fuel cell 8 but the combustor 2 by a suitable switching valve (not shown) through a bypass passage on which the sealing device 10C is provided. The combustor 2 combusts using the hydrogen-containing gas to generate the heat necessary for the steam-reforming reaction in the reformer 1. When the reformer 1 is adequately increased in temperature, the concentration of the carbon monoxide in the hydrogen-containing gas is lowered, and the highly-concentrated hydrogen is generated, the hydrogen-containing gas starts to be supplied to the fuel cell 8 using the switching valve, and the fuel cell 8 generates electric power by the reaction between the hydrogen-containing gas and the air. At this time, the hydrogen-containing gas (anode off gas) unconsumed for electric power generation in the fuel cell 8 and released from the fuel cell 8 is supplied to the combustor 2 and utilized as a combustion energy for heating the reforming catalyst body of the reformer 1. Moreover, the electric power and the heat can be generated in the electric power generation of the fuel cell 8. Therefore, while maintaining the temperature of the fuel cell 8 at a suitable temperature, the cooling water is circulated in the fuel cell 8 to effectively extract the generated heat of the fuel cell 8. Thus, the heat exchange with the cooling water is executed. Then, the cooling water warmed up by the heat exchange is stored in, for example, a hot water tank (not shown), and utilized as, for example, hot water for domestic use.

Thus, the fuel cell system 110 of the present embodiment realizes efficient electric power generation while effectively utilizing the energy.

As shown in FIG. 3, the depressurizer 3 of the fuel cell system 110 is coupled via a falling slope passage 27 to the hopper 26 capable of discharging unnecessary water from the fuel cell system 110.

The hopper 26 includes a hollow water storing portion 26B which is provided outside a wall portion 25 constituting the casing of the fuel cell system 110, and is a receiver configured to receive the steam and the condensed water of the steam discharged from the lower end of the falling slope passage 27. Then, the hopper 26 includes a discharging function 26A (drain hose for example) configured to introduce overflow water in a condensed water tank 22 of the fuel cell system 110 to the outside. The condensed water tank 22 stores a certain amount of recovered water by the adjustment of the amount of overflow water.

Meanwhile, the high-temperature gas from the depressurizer 3 is cooled down and condenses while flowing through the falling slope passage 27. The hopper 26 also serves as a discharger configured such that the condensed water is also wasted to the outside, since the water is discharged using the discharging function 26A capable of discharging the water stored in the water storing portion 26B of the hopper 26.

Moreover, the hopper 26 further includes an releasing structure 26C having an atmosphere opening capable of releasing to the atmosphere the steam discharged from the lower end of the falling slope passage 27.

In the operation of the fuel cell system 110, the reforming water supplied to the water evaporator 4 and the cooling water used to cool down the fuel cell 8 are used. Here, it is preferable that the water in the flue gas of the combustor 2, the water in a cathode off gas having flowed through a cathode of the fuel cell 8, the water in the anode off gas having flowed through an anode of the fuel cell 8, and the like be recovered, and such recovered water be used as the water (reforming water, cooling water) necessary in the fuel cell system 110.

Moreover, adopted as the hydrogen generator 100 is a mode in which only the reformer 1 is provided. However, in a case where the fuel cell 8 is a low-temperature type fuel cell (polymer electrolyte fuel cell for example), adopted to reduce the carbon monoxide concentration may be a mode in which a reactor (shift converter, and the like) configured to reduce the carbon monoxide is provided downstream of the reformer 1.

Moreover, adopted is a mode in which the bypass passage and the sealing device 10C are provided to prevent the hydrogen-containing gas whose carbon monoxide concentration is not adequately lowered from being supplied to the fuel cell 8 in the start-up operation of the fuel cell system. However, the bypass passage and the sealing device may not be provided in a case where the fuel cell is a fuel cell (for example, a high-temperature type fuel cell, such as a SOFC) whose anode electrode is less likely to be poisoned by the carbon monoxide.

Further, by providing at least the sealing device 10B in the mode in which the bypass passage and the sealing device 10C are not provided, it is possible to block the communication between the atmosphere and each of the gas passages in both the hydrogen generator 100 and the fuel cell 8. Therefore, the mode in which only the sealing device 10B is provided may be adopted.

Next, the operations of the fuel cell system 110 of the present embodiment will be described. Since the operations of the hydrogen generator 100 have been described in detail in Embodiment 1, explanations of the operations related to the hydrogen generator 100 are omitted or outlined herein. Moreover, the start-up operation of the fuel cell system 110 is omitted herein since it can be understood by referring to the explanation in Embodiment 1. The controller 50 can be used as a control unit for the entire operation of the fuel cell system 100 of the present embodiment.

In the normal stop operation in which the electric power supply to the fuel cell system 110 is not cut by the power outage, the breaker, or the like, the fuel cell system 110 is sealed by sealing the input portions and output portions of the hydrogen generator 100 and the input portion and output portion of the fuel cell 8.

At this time, the communication between the hydrogen generator 100 and the fuel cell 8 may be maintained. However, in the present embodiment, the communication between the hydrogen generator 100 and the fuel cell 8 is blocked by the sealing device 10A (solenoid valve). In this case, the output portion of the fuel cell 8 is closed by the sealing device 10B (solenoid valve). Moreover, the bypass passage that is one of the output portions of the hydrogen generator 100 is closed by the sealing device 10C.

Then, with the fuel cell system 110 sealed, the volume expansion occurs by the water evaporation caused by the remaining heat of the hydrogen generator 100. Then, in a case where the internal pressure in the hydrogen generator 100 is increased to the second upper limit pressure or higher, executed is the depressurizing operation of releasing the internal pressure of the hydrogen generator 100 to the atmosphere by cancelling the sealing of the sealing device 10C (on-off valve) by the controller 50. Instead of this depressurizing operation, adopted may be a mode of executing a depressurizing operation by cancelling the sealing of the sealing device 10A and the sealing of the sealing device 10B (by cancelling the sealing of the sealing device 10B when stopping the sealing device 10A without sealing the sealing device 10A).

Moreover, in a case where the temperature of the hydrogen generator 100 is decreased to decrease the internal pressure of the hydrogen generator 100, the pressurizing operation is executed by the controller 50 as with Embodiment 1. The depressurizing operation and the pressurizing operation are suitably executed in at least one of the stop operation of the fuel cell system 110 and the start-up standby period of the fuel cell system 110.

Next, the following will describe the stop operation in a case where the electric power supply to the fuel cell system 110 is cut by the power outage, the breaker, or the like during the start-up operation of the fuel cell system 110 or the hydrogen supplying operation of the fuel cell system 110 (the stop operation in an abnormal case).

In a case where the electric power supply to the fuel cell system 110 is cut, all of various normally closed valves (sealing devices 10A, 10B, and 10C for example) capable of opening and closing the input portions and output portions of the gases (the raw material, the hydrogen-containing gas, and the oxidizing gas) and the reforming water of the fuel cell system 110 are closed. At the same time, the suppliers, such as the raw material supplier 6 and the water supplier 5, stop operating.

As with Embodiment 1, for a while after the water supplier 5 stops operating, the water remaining in the pipe extending from the water supplier 5 to the water evaporator 4 and the water in the water evaporator 4 continue to be evaporated by the remaining heat of the hydrogen generator 100. Therefore, the steam is continuously generated in the hydrogen generator 100 of the fuel cell system 110. Because of the volume expansion caused by the generation of the steam, the internal pressure of the hydrogen generator 100 sealed by the above-described sealing devices (sealing devices 10A, 10B, and 10C) increases.

It is preferable that in a case where the internal pressure of the hydrogen generator 100 is increased to the second upper limit pressure or higher, the depressurizing operation of the hydrogen generator 100 be carried out by the controller 50.

However, in this case, the electric power supply to the fuel cell system 110 is cut by the power outage, the breaker, or the like, so that the open-close operations of the sealing devices 10A, 10B, and 10C cannot be carried out by the controller 50. To be specific, the above-described depressurizing operation using the sealing device 10C (or the sealing device 10A or 10B) cannot be carried out.

In the present embodiment, in a case where the gas pressure in the fuel cell system 110 is excessively increased to the first upper limit pressure (herein, 50 kPa) or higher, the water evaporator 4 and the atmosphere are communicated with each other by the relief mechanism of the depressurizer 3, so that the internal pressure of the hydrogen generator 100 is released to the atmosphere. Here, the fuel cell system 110 of the present embodiment is configured such that by providing the depressurizer 3 on the passage located upstream of the reformer 1, the steam that is a cause of the increase in the internal pressure of the fuel cell system 110 can be successfully released to the outside while further suppressing the leakage of the hydrogen-containing gas (carbon monoxide), remaining in the fuel cell system 110, as compared to before. Herein, the first upper limit pressure is set to 50 kPa. However, the withstanding pressures of the devices are different from one another depending on the characteristics of the devices, so that the other value may be adopted as the first upper limit pressure as long as it does not cause the malfunction of the devices.

In the device in which the reformer 1 and the water evaporator 4 are integrally formed as in the present embodiment (FIG. 3), it is favorable to provide the depressurizer 3 on the passage located upstream of the reformer 1 and the water evaporator 4. With this, the steam can be preferentially discharged, and the release of the hydrogen-containing gas (carbon monoxide) can be further suppressed as compared to before. Meanwhile, in a case where the reformer 1 and the water evaporator 4 are separately formed and are coupled to each other by a suitable pipe, the depressurizer 3 may be provided on the pipe extending between the reformer 1 and the water evaporator 4.

Moreover, if the high-temperature steam is cooled down, the steam condenses into the water, so that the volume of the gas to be discharged to the outside can be contracted. Therefore, in the present embodiment, the gas having flowed through the depressurizer 3 is not directly discharged to the atmosphere, but flows through the passage (above-described falling slope passage 27) for discharging the steam-containing gas to be introduced into the hopper 26 together with the condensed water generated by cooling down the steam. The water can be appropriately discharged using the discharging function 26A (discharger).

Moreover, as in the present embodiment, in a case where the fuel cell system 110 includes as a standard component the hopper 26 serving as the discharger capable of discharging to the outside of the system the water discharged from respective components (such as the hydrogen generator 100 and the fuel cell 8) of the fuel cell system 110, the configuration for discharging to the outside the water condensed from the gas discharged from the depressurizer 3 can be simplified by utilizing the hopper 26. Moreover, the volume of the gas discharged from the releasing structure 26C of the hopper 26 contracts since the steam in the gas condenses while the gas is flowing in the passage for discharging the steam-containing gas. Therefore, it is possible to suppress rapid gas discharge to the outside of the fuel cell system 110. Further, the high-temperature gas discharged from the depressurizer 3 is cooled down while the gas is flowing through the passage for discharging the steam-containing gas. Therefore, the risk of a user getting burned by the gas discharged from the releasing structure 26C of the hopper 26 to the outside of the fuel cell system 110 is reduced.

Modification Example 1

Modification Example 1 will explain a configuration example of the depressurizer 3 in a case where the depressurizer 3 is provided on the raw material supplying passage (for example, the passage C or the passage F shown in FIG. 2).

Figure 4:
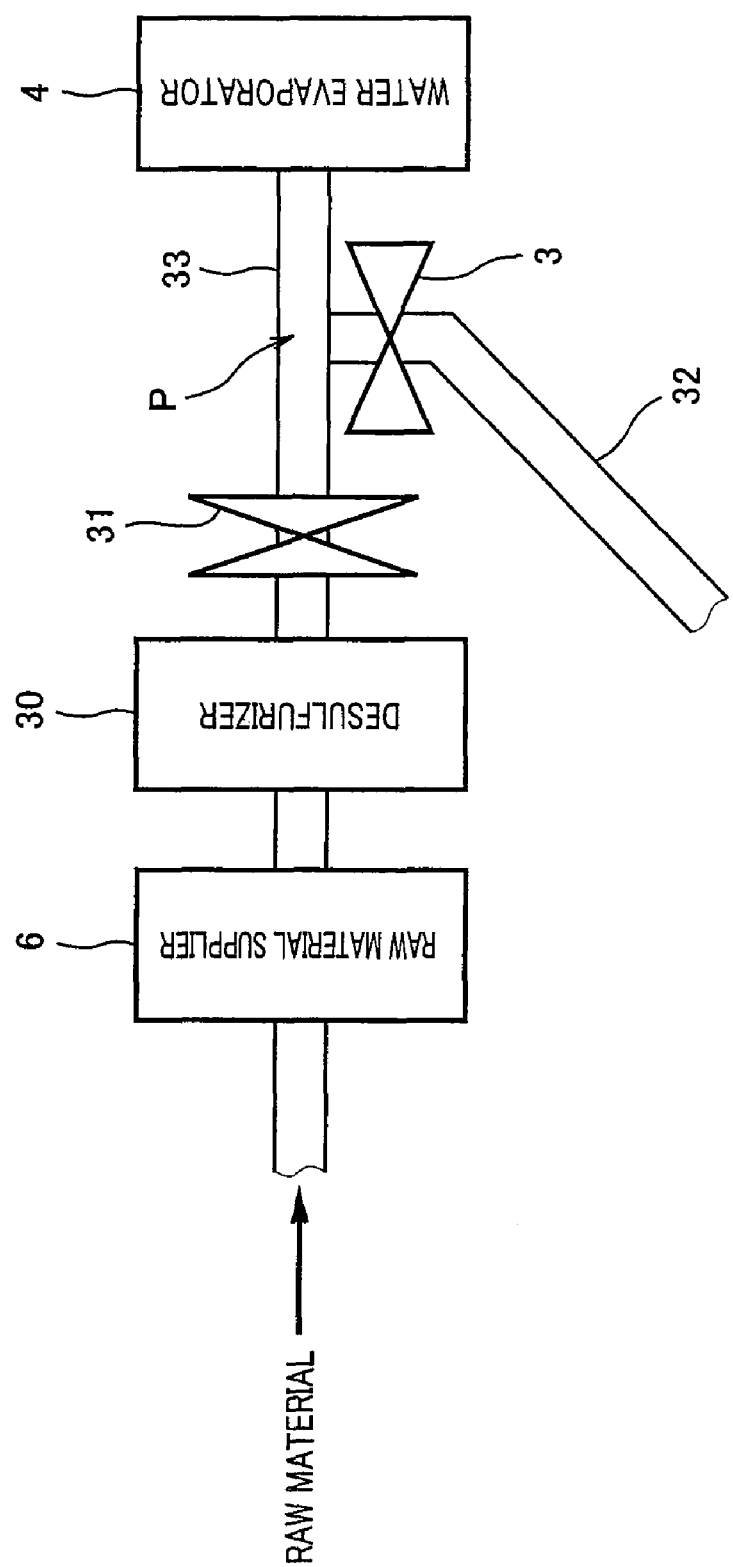
FIG. 4 is a diagram schematically showing a configuration example of the depressurizer.

FIG. 4 is a diagram schematically showing the configuration example of the depressurizer.

As shown in FIG. 4, in a case where the city gas is used as the raw material, a desulfurizer 30 (one example of a deodorizer) capable of removing a sulfur constituent (one example of an odorous component for detecting the gas leakage) contained in the city gas is provided on a horizontal pipe 33 constituting a passage located downstream of the raw material supplier 6. Moreover, an on-off valve 31 (steam backflow prevention valve 31 capable of preventing the steam from flowing backward to the desulfurizer 30 side) is provided on a portion of the horizontal pipe 33 which portion is located downstream of the desulfurizer 30 and between the desulfurizer 30 and the water evaporator 4 (reformer 1). The on-off valve 31 is configured to block the flow of the gas from the reformer 1 to the desulfurizer 30 when the sealing device 10 is closed. There is a possibility that the steam flows backward to the desulfurizer 30 due to the increase in the internal pressure of the hydrogen generator 100 after the sealing device 10 is closed. However, the inflow of the steam to the desulfurizer 30 is suppressed by the action of the on-off valve 31. As a result, steam adsorption by the desulfurizer 30 (one example of the deodorizer) can be suppressed, so that the performance degradation of the desulfurizer 30 (one example of the deodorizer) can be suppressed.

As the on-off valve 31, a solenoid valve can be used in addition to a simple-structure spring type check valve. In a case where the solenoid valve is used as the on-off valve 31, in the normal stop operation of the hydrogen generator 100 (fuel cell system 110) in which the electric power supply is not cut, the on-off valve 31 is closed by the controller 50 before the sealing device 10 is closed. Thus, the inflow of the steam to the desulfurizer 30 is suppressed. Moreover, it is preferable that the on-off valve 31 be a normally closed type to deal with a case where the electric power supply to the hydrogen generator 100 is cut. This is because the on-off valve 31 is automatically closed simultaneously with the sealing of the sealing device 10, so that the inflow of the steam to the desulfurizer 30 is suppressed.

As above, Modification Example 1 is configured such that with the sealing device 10 closed, the steam does not flow through the raw material passage, located upstream of the on-off valve 31, by the on-off valve 31. Therefore, Modification Example 1 has a feature that the depressurizer 3 is provided on the raw material passage located downstream of the on-off valve 31.

Specifically, as shown in FIG. 4, the depressurizer 3 is provided on a portion of a falling slope passage 32 which portion is adjacent to a connection position P where the horizontal pipe 33 and a falling slope pipe 32 constituting the falling slope passage are connected to each other.

Modification Example 2

Embodiments 1 and 2 have described a mode in which the depressurizing is carried out by the depressurizer 3 including the relief mechanism in a case where the depressurizing operation using the sealing device 10 by the controller 50 cannot be executed, such as a case where the electric power supply is cut. However, Modification Example 2 is configured such that even in the normal stop operation in which the electric power supply is not cut, the depressurizing operation using the relief mechanism of the depressurizer 3 is carried out without executing the depressurizing operation using the sealing device 10 by the controller 50.

Modification Example 3

Regarding the number of solenoid valves which are used as the depressurizer 3 and each of which has the spring sealing mechanism, the depressurizer 3 may be inexpensively realized by one solenoid valve.

Moreover, two or more solenoid valves may be arranged in series. With this, even if one of the solenoid valves breaks down and does not close for some reasons, the other solenoid valve(s) can close. Therefore, the depressurizer 3 can effectively function. On this account, the reliability of the depressurizer 3 improves.

Modification Example 4

Embodiments 1 and 2 have described an example in which the depressurizer 3 includes the pressure escape mechanism (relief mechanism) utilizing the sealing of the spring pressure. However, the present invention is not limited to this. For example, in a case where the depressurizer 3 is an on-off valve which does not have the relief mechanism, and the pressure detected by the pressure detector 9 is the second upper limit pressure or higher in the normal stop operation in which the electric power supply to the hydrogen generator 100 is not cut, the controller 50 executes the depressurizing operation by opening the on-off valve. In this case, in a case where the electric power supply to the hydrogen generator 100 is cut, the internal pressure of the hydrogen generator 100 cannot be released, so that the pressure is applied to the hydrogen generator, which is not preferable. However, as compared to a case where the depressurizing is carried out from the downstream of the reformer in a case where the electric power supply is not cut as in the hydrogen generator described in Patent Document 2, it is possible to further reduce the possibility that the hydrogen-containing gas (carbon monoxide) leaks from the reformer 1 in the depressurizing operation.

Modification Example 5

Embodiments 1 and 2 have adopted a mode in which the sealing of the sealing device 10 is canceled as the depressurizing operation in a case where the internal pressure of the hydrogen generator 100 is the first upper limit pressure or higher. However, Modification Example 5 is configured such that in a case where the depressurizer 3 is the solenoid valve having the spring sealing mechanism, and the internal pressure of the hydrogen generator 100 is the second upper limit pressure or higher, the internal pressure of the hydrogen generator 100 is released by opening the solenoid valve by the controller 50. Also, Modification Example 5 is configured such that in a case where the electric power supply is cut, and the internal pressure of the hydrogen generator 100 is the first upper limit pressure or higher, the internal pressure of the hydrogen generator 100 is released from the depressurizer 3 by cancelling the sealing of the spring sealing mechanism. With this, the gas at the time of the depressurizing operation is released from the passage located upstream of the reformer 1 even in the normal stop operation in which the electric power supply is not cut. Therefore, as compared to Embodiments 1 and 2, it is possible to reduce the possibility that the hydrogen-containing gas (carbon monoxide) leaks from the reformer 1 in the depressurizing operation, which is preferable.

Modification Example 6

Embodiment 1 has exemplified the discharger 7 as the receiver configured to receive the condensed water discharged together with the gas discharged from the lower end of the falling slope passage. Embodiment 2 exemplifies the hopper 26 as the receiver configured to receive the condensed water obtained by condensing the steam in the gas discharged from the lower end of the falling slope passage 27.

Figure 5:
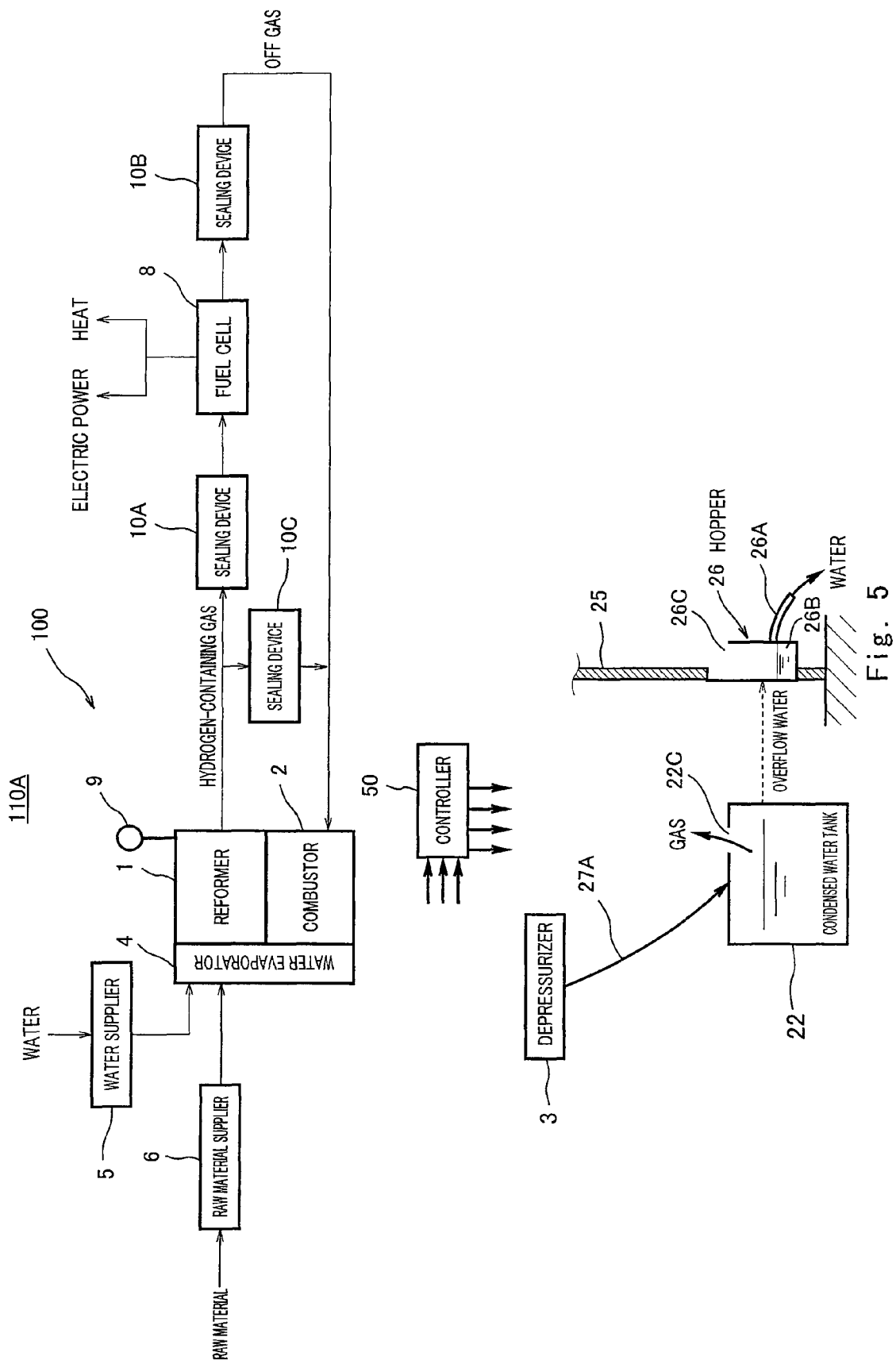
FIG. 5 is a block diagram schematically showing a configuration example of the fuel cell system in Modification Example 6 of the present invention.

FIG. 5 is a block diagram schematically showing a configuration example of the fuel cell system in Modification Example 6 of the present invention.

In a fuel cell system 110A of Modification Example 6, the condensed water tank 22 of the fuel cell system 110A serves as the receiver. To be specific, as shown in FIG. 5, the condensed water tank 22 is a receiver configured to receive the condensed water discharged from a lower end of a falling slope passage 27A. The condensed water is discharged to an outside of the fuel cell system 110A by using an overflow function (discharging function) of the condensed water tank 22. The gas (steam) is released to the atmosphere by using an releasing structure 22C of the condensed water tank 22.

From the foregoing explanation, many modifications and other embodiments of the present invention are obvious to one skilled in the art. Therefore, the foregoing explanation should be interpreted only as an example, and is provided for the purpose of teaching the best mode for carrying out the present invention to one skilled in the art. The structures and/or functional details may be substantially modified within the spirit of the present invention.

Industrial Applicability

In accordance with the hydrogen generator and fuel cell system of the present invention, when the hydrogen generator is stopped, such as when the electric power supply is cut, the inside of the hydrogen generator can be depressurized while further suppressing the leakage of the carbon monoxide gas in the hydrogen generator as compared to before. Therefore, the present invention is applicable to, for example, an electric power generating system for domestic use.

The invention claimed is:

1. A hydrogen generating apparatus comprising:
    a reformer configured to generate a hydrogen-containing gas using a raw material and steam;
    a water evaporator configured to supply the steam to the reformer;
    a first passage located downstream of the reformer, a downstream end of the first passage being communicated with atmosphere;
    a sealing device provided on the first passage and configured to block a gas in the first passage from flowing to the atmosphere;
    a second passage located upstream of the reformer; and
    a depressurizer provided on the second passage and configured to release to the atmosphere, pressure in an internal space including the reformer increased by water evaporation in the water evaporator after the sealing device is closed.

2. The hydrogen generating apparatus according to claim 1, wherein the second passage, on which the depressurizer is provided, is a passage which connects the water evaporator and the reformer.

3. The hydrogen generating apparatus according to claim 1, further comprising a raw material supplier configured to supply the raw material to the reformer, wherein
    the second passage, on which the depressurizer is provided, is a passage which connects the raw material supplier and the reformer.

4. The hydrogen generating apparatus according to claim 3, further comprising:
    a deodorizer configured to remove an odorous component in the raw material supplied to the reformer; and
    an on-off valve provided on the second passage, wherein:
    the on-off valve is configured to block the gas from flowing from the reformer to the deodorizer when the sealing device is closed, and
    the second passage, on which the depressurizer and the on-off valve are provided, is a passage which connects the deodorizer and the reformer.

5. The hydrogen generating apparatus according to claim 1, wherein the second passage, on which the depressurizer is provided, is located upstream of the water evaporator.

6. The hydrogen generating apparatus according to claim 5, further comprising a water supplier configured to supply water to the water evaporator, wherein
    the second passage, on which the depressurizer is provided, is a passage which connects the water supplier and the water evaporator.

7. The hydrogen generating apparatus according to claim 5, further comprising a raw material supplier configured to supply the raw material to the reformer, wherein
    the second passage, on which the depressurizer is provided, is a passage which connects the raw material supplier and the water evaporator.

8. The hydrogen generating apparatus according to claim 7, further comprising:
    a deodorizer configured to remove an odorous component in the raw material supplied to the reformer; and
    an on-off valve provided on the passage, wherein:
    the on-off valve is configured to block the gas from flowing from the reformer to the deodorizer when the sealing device is closed, and
    the second passage, on which the depressurizer and the on-off valve are provided, is a passage which connects the deodorizer and the reformer.

9. The hydrogen generating apparatus according to claim 1, wherein the sealing device is a normally closed valve.

10. The hydrogen generating apparatus according to claim 1, wherein the depressurizer is a valve including a relief mechanism capable of releasing the pressure in the internal space to the atmosphere in a case where the pressure in the internal space is a first upper limit pressure or higher.

11. The hydrogen generating apparatus according to claim 1, wherein the depressurizer is a solenoid valve including a spring sealing mechanism and is configured to cancel sealing of the spring sealing mechanism in a case where the pressure in the internal space is the first upper limit pressure or higher.

12. The hydrogen generating apparatus according to claim 11, further comprising:
a pressure detector configured to detect the pressure in the internal space including the reformer sealed by the sealing device; and
a control unit configured to cause the sealing device to release the pressure in the internal space to the atmosphere in a case where the pressure detected by the pressure detector is equal to or higher than a second upper limit pressure that is lower than the first upper limit pressure.

13. The hydrogen generating apparatus according to claim 11, wherein during at least one of a start-up standby period of the hydrogen generating apparatus and a start-up operation of the hydrogen generating apparatus, the solenoid valve carries out an open-close operation once in at least one of a predetermined cumulative operating time, a predetermined cumulative number of times of operations, a predetermined period of time, and a predetermined consecutive start-up standby time.

14. The hydrogen generating apparatus according to claim 1, further comprising:
a pressure detector configured to detect the pressure in the internal space including the reformer sealed by the sealing device; and
a control unit, wherein:
the depressurizer is an on-off valve, and
the control unit causes the on-off valve to open in a case where the pressure detected by the pressure detector is a second upper limit pressure or higher.

15. The hydrogen generating apparatus according to claim 14, wherein:
the on-off valve includes a relief mechanism capable of releasing the pressure in the internal space to the atmosphere in a case where the pressure in the internal space is a first upper limit pressure or higher; and
the second upper limit pressure is lower than the first upper limit pressure.

16. The hydrogen generating apparatus according to claim 1, further comprising:
a falling slope passage through which the gas discharged from the depressurizer is introduced downward; and
a receiver configured to receive the water discharged from a lower end of the falling slope passage.

17. The hydrogen generating apparatus according to claim 16, wherein:
the receiver includes a water storing portion configured to store the water and a discharging mechanism configured to discharge the water stored in the water storing portion; and
condensed water is released to an outside of the hydrogen generating apparatus by discharging the water using the discharging mechanism.

18. The hydrogen generating apparatus according to claim 17, wherein the receiver includes a releasing structure capable of releasing to the atmosphere the gas discharged from the lower end of the falling slope passage.

19. A fuel cell system comprising:
the hydrogen generating apparatus according to claim 1; and
a fuel cell configured to generate electric power by using the hydrogen-containing gas supplied from the hydrogen generating apparatus.

20. The hydrogen generating apparatus according to claim 1, wherein the sealing device is a valve.

* * * * *